United States Patent
Jo et al.

(10) Patent No.: US 11,623,303 B2
(45) Date of Patent: Apr. 11, 2023

(54) PRESSURIZING MASK AND METHOD FOR JOINING TOP CAP ASSEMBLY AND ELECTRODE TAB BY USING PRESSURIZING MASK

(71) Applicant: LG CHEM, LTD., Seoul (KR)

(72) Inventors: Minki Jo, Daejeon (KR); Je Jun Lee, Daejeon (KR); Sang Sok Jung, Daejeon (KR); Jin Uk Do, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 1031 days.

(21) Appl. No.: 16/340,987

(22) PCT Filed: Aug. 13, 2018

(86) PCT No.: PCT/KR2018/009279
§ 371 (c)(1),
(2) Date: Apr. 10, 2019

(87) PCT Pub. No.: WO2019/035620
PCT Pub. Date: Feb. 21, 2019

(65) Prior Publication Data
US 2019/0291207 A1    Sep. 26, 2019

(30) Foreign Application Priority Data
Aug. 14, 2017   (KR) .................. 10-2017-0103196

(51) Int. Cl.
*H01M 50/147*   (2021.01)
*H01M 50/172*   (2021.01)
(Continued)

(52) U.S. Cl.
CPC ........... *B23K 26/22* (2013.01); *H01M 50/147* (2021.01); *H01M 50/179* (2021.01);
(Continued)

(58) Field of Classification Search
CPC .. H01M 50/10; H01M 50/531; H01M 50/572; H01M 50/147
See application file for complete search history.

(56) References Cited

U.S. PATENT DOCUMENTS

| 5,418,082 A | 5/1995 | Taki et al. |
| 6,537,693 B1 | 3/2003 | Suzuki et al. |

(Continued)

FOREIGN PATENT DOCUMENTS

| EP | 2733767 A2 | 5/2014 |
| EP | 2736098 A1 | 5/2014 |

(Continued)

OTHER PUBLICATIONS

International Search Report for PCT/KR2018/009279 (PCT/ISA/210) dated Dec. 4, 2018.
(Continued)

*Primary Examiner* — Kenneth J Douyette
(74) *Attorney, Agent, or Firm* — Birch, Stewart, Kolasch & Birch, LLP (57) ABSTRACT

A pressurizing mask for supporting a combination of a top cap assembly and an electrode assembly has a welding portion and an indent portion into which an electrode tab is inserted.

10 Claims, 6 Drawing Sheets

(51) Int. Cl.
  *H01M 50/531* (2021.01)
  *H01M 50/572* (2021.01)
  *B23K 26/22* (2006.01)
  *H01M 50/578* (2021.01)
  *H01M 50/574* (2021.01)
  *H01M 50/179* (2021.01)
  *B23K 101/36* (2006.01)

(52) U.S. Cl.
  CPC ....... *H01M 50/531* (2021.01); *H01M 50/574* (2021.01); *H01M 50/578* (2021.01); *B23K 2101/36* (2018.08); *H01M 2200/20* (2013.01)

(56) References Cited

U.S. PATENT DOCUMENTS

| | | | |
|---|---|---|---|
| 9,065,102 B2 | 6/2015 | Kim | |
| 10,084,173 B2 | 9/2018 | Ha | |
| 2006/0088761 A1* | 4/2006 | Ota | H01M 6/46 429/162 |
| 2009/0061310 A1 | 3/2009 | Kim et al. | |
| 2009/0117459 A1 | 5/2009 | Hyung et al. | |
| 2010/0216013 A1 | 8/2010 | Kim | |
| 2011/0008654 A1 | 1/2011 | Kim et al. | |
| 2012/0107670 A1* | 5/2012 | Viavattine | H01M 10/0436 429/153 |
| 2014/0193700 A1* | 7/2014 | Okuda | H01M 10/28 429/164 |
| 2015/0333313 A1 | 11/2015 | Yamato et al. | |
| 2016/0049633 A1* | 2/2016 | Kang | H01M 50/533 429/211 |

FOREIGN PATENT DOCUMENTS

| | | |
|---|---|---|
| JP | 05-343043 A | 12/1993 |
| JP | 06-077160 U | 10/1994 |
| JP | 2001-148240 A | 6/2001 |
| JP | 2009-266714 A | 11/2009 |
| KR | 2000-0042900 A | 7/2000 |
| KR | 10-0882916 B1 | 2/2009 |
| KR | 10-0947989 B1 | 3/2010 |
| KR | 10-0966549 B1 | 6/2010 |
| KR | 10-2010-0097592 A | 9/2010 |
| KR | 10-2013-0019706 A | 2/2013 |
| KR | 10-2013-0034284 A | 4/2013 |
| KR | 10-2013-0040576 A | 4/2013 |
| KR | 10-2015-0051518 A | 5/2015 |
| KR | 10-2016-0103848 A | 9/2016 |
| WO | WO 2018/030679 A1 | 2/2018 |

OTHER PUBLICATIONS

Extended European Search Report, dated Dec. 17, 2019, for European Application No. 18846535.5.

* cited by examiner

FIG. 1

Prior Art

PRESSURIZING MASK AND METHOD FOR JOINING TOP CAP ASSEMBLY AND ELECTRODE TAB BY USING PRESSURIZING MASK

CROSS-REFERENCE TO RELATED APPLICATION(S)

This application claims priority to and the benefit of Korean Patent Application No. 10-2017-0103196 filed in the Korean Intellectual Property Office on Aug. 14, 2017, the entire contents of which are incorporated herein by reference.

TECHNICAL FIELD

The present invention relates to a pressurizing mask, and a method for combining a top cap assembly and an electrode tab by using the pressurizing mask.

BACKGROUND ART

In general, rechargeable batteries are rechargeable and allow down-sizing and large capacity as merits, so their development and use are recently increasing.

A basic configuration of the rechargeable battery includes an electrode assembly including a positive electrode, a negative electrode, and a separation film, and an external material for sealing and receiving the electrode assembly with an electrolyte solution.

Regarding a characteristic of a form of the rechargeable battery, for example, it may be referred to as a cylindrical rechargeable battery when the electrode assembly is spirally wound in a cylindrical form and is received in a metallic cylindrical can, and it may be referred to as a square rechargeable battery when its shape is square. Exceptionally, a rectangular rechargeable battery in which an electrode assembly is received in a pouch-type case of a laminate sheet is referred to as a pouch-type rechargeable battery.

Among them, the cylindrical rechargeable battery includes a cylindrical can and an electrode assembly received inside the cylindrical can as described above, and it further includes a top cap assembly combined to an upper portion of the cylindrical can.

The top cap assembly is a member mounted on an opened upper end of the cylindrical can and sealed thereto, and it is also a member connected to the electrode tab of the electrode assembly and functioning as an electrode terminal.

Figure 1:
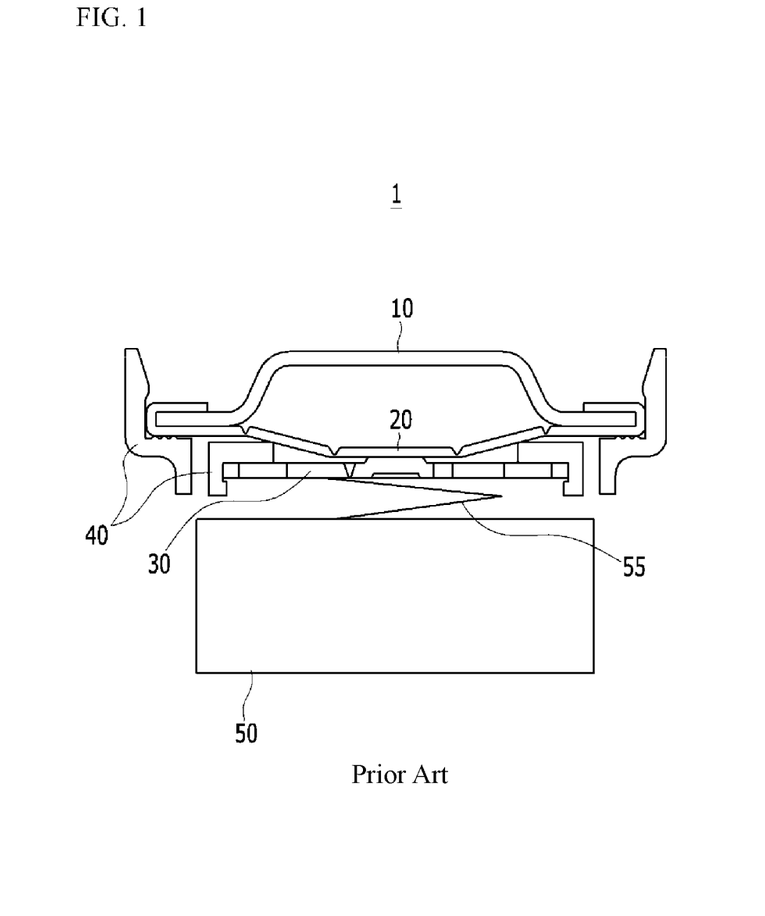
FIG. 1 shows a schematic view of a top cap assembly.
Figure 2:
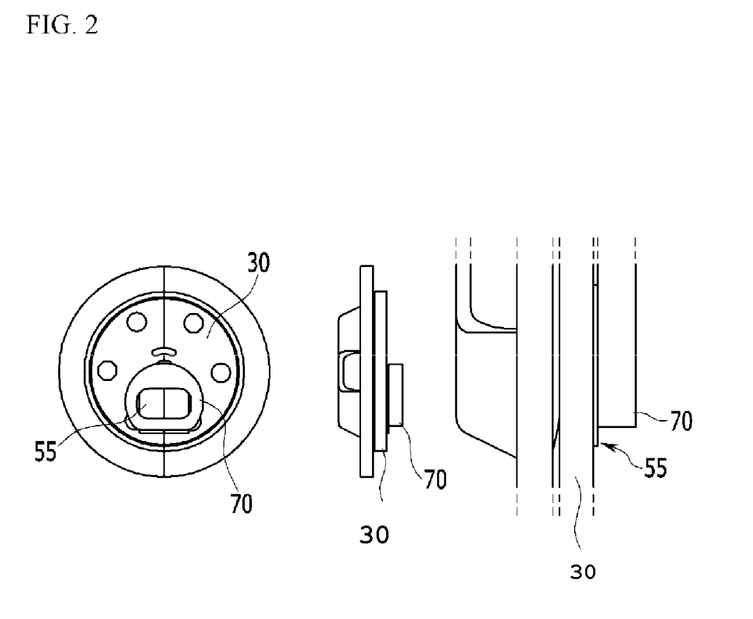
FIG. 2 shows a schematic view of a coupling process for combining a top cap assembly and an electrode tab by using a mask according to prior art.

In relation to this, FIG. 1 shows a schematic structure of the top cap assembly, and FIG. 2 shows a schematic view of a process for combining a top cap assembly and an electrode tab.

Referring to the drawings, the top cap assembly 1 includes: a current interrupt device 30; a safety vent 20 connected to an upper portion of the current interrupt device 30, including a plurality of notches to be broken when a voltage is equal to or greater than an allowable voltage of the current interrupt device 30, and discharging gas provided inside the battery; a top cap 10 that is an electrode end electrically connected to the safety vent 20 and protruding upward; and a gasket 40 for wrapping and sealing an external circumferential surface of the current interrupt device 30, the safety vent 20, and the top cap 10. Regarding the above-noted structure, the top cap assembly 1 and an electrode assembly 50 may be physically and electrically coupled when bonded to the current interrupt device 30 and an electrode tab 55 of the electrode assembly 50 through welding.

Further, a method for pressurizing and fixing the electrode tab and the current interrupt device 30 by using a pressurizing mask 70 as shown in FIG. 2 for welding between the electrode tab 55 and the current interrupt device 30 is used.

However, a center of the current interrupt device 30 is separated from the main body of the member 30 together with the safety vent 20 in an emergency, so it is usual for the electrode tab to be welded on a position away from the center of the current interrupt device 30.

Therefore, according to the above-described method, the mask 70 must be pressurized at the position away from the center of the current interrupt device 30, and resultantly, asymmetric pressure is applied to the top cap assembly 1, and the top cap assembly 1 may be asymmetrically transformed.

Further, since the top cap assembly 1 is formed by assembling a plurality of parts, the applying of asymmetric pressure may cause the parts to be dislocated or separated.

In addition, the mask 70 pressurizes the electrode tab 55 provided on the current interrupt device 30 and the pressure is indirectly applied to the top cap assembly 1 through the current interrupt device 30, so it is difficult to firmly fix the current interrupt device 30 actually performing bonding, and the current interrupt device 30 may be partly transformed when a pressure is particularly provided to a portion closely attached to the electrode tab 55.

Accordingly, there is a great need for the development of a technology that can fundamentally solve the problem.

DISCLOSURE

Technical Problem

An object of the present invention is to solve the problems of the prior art and technical problems from the past.

In detail, the present invention has been made in an effort to provide a newly-structured pressurizing mask for applying a uniform pressure to an entire top cap assembly while pressurizing a current interrupt device and an electrode tab.

The present invention has been made in another effort to provide a method for stably welding a current interrupt device and an electrode tab by using a pressurizing mask.

Technical Solution

An exemplary embodiment of the present invention provides a pressurizing mask for supporting a combination of a top cap assembly and an electrode assembly, a body having including an external edge forming a circle in a plane view, wherein a welding portion for exposing an electrode tab is formed spaced from a center of the body, and an indent portion into which the electrode tab is inserted is formed in a peripheral portion of the welding portion.

Merits of the present invention are that the indent portion is formed in the pressurizing mask, and in detail, a pressure is directly applied to the electrode tab inserted into the indent portion, a portion except the indent portion is attached to the current interrupt device, and a pressure may be directly applied to the current interrupt device.

This may allow firm fixation and transformation prevention of the current interrupt device, in comparison with the structure in which a pressure is directly applied to the conventional mask, that is, the electrode tab and a pressure is indirectly applied to the current interrupt device through the electrode tab, thereby solving the problem according to prior art.

In a detailed example, a depth of the indent portion may be 99% to 101% of a thickness of the electrode tab, and a width of the indent portion may be 99% to 101% of a width of the electrode tab.

A range of a depth and a width of the indent portion is determined in consideration of the fact that the tab is somewhat extended or compressed when the electrode tab is pressurized, and it may be designed to have a desired size according to a material of the electrode tab.

However, when the depth of the indent portion is less than a minimum of the above-noted range, the electrode tab protrudes higher than the indent portion, so it may be difficult to directly pressurize the current interrupt device, and when the depth exceeds a maximum of the range, the electrode tab may not be pressurized. The above description may also be applicable to the width of the indent portion.

In a detailed example, indent portion may be formed on a first side of the body to traverse the welding portion from the external edge, and the electrode tab may be exposed to an outside through the welding portion on a second side of the body that is an opposite side of the first side of the body.

In the above-noted structure, regarding the pressurizing mask, when an electrode tab is mounted to the indent portion, the first side of the body may be configured to contact a current interrupt device of the top cap assembly, and when a pressure is applied in a direction of the first side from the second side, the current interrupt device and the electrode tab may be configured to be pressurized to support welding between the current interrupt device and the electrode tab.

Further, laser welding may be performed through the surface of the electrode tab exposed to the outside through the welding portion.

The welding portion may extend along at least one middle portion from of a radius extending between the center of the body and the external edge, and the welding portion may be perforated at a position where a mass center on a plane corresponds to the middle portion.

Therefore, when the electrode tab and the current interrupt device are pressurized at the position where the center of the pressurizing mask corresponds to the center of the current interrupt device, the welding portion is provided to be biased, so the electrode tab may be bonded to the center of the current interrupt device at a biased position.

As described above, this is because the center of the current interrupt device is separated together with the safety vent in an emergency, the center is an inappropriate portion for the electrode tab to be welded, and the electrode tab is to be welded at the position that is biased from the center of the current interrupt device.

The welding portion may have a form including a circle, an oval, a polygon, or at least one curved line in a plane view, and it is not limited to the above-noted examples.

A material of the pressurizing mask may insulate electricity and may have predetermined elasticity, and for example, it may be a natural or synthetic rubber, or a polymer plastic such as polyethylene, polypropylene, or polyurethane, and the material of the pressurizing mask is not limited thereto.

Another embodiment of the present invention provides a method for combining an electrode tab of an electrode assembly to a top cap assembly.

In detail, the method includes: attaching the electrode tab to a current interrupt device of the top cap assembly; pressurizing the current interrupt device with a pressurizing mask having a welding portion for exposing a first part of the electrode tab; and bonding the electrode tab and the current interrupt device by welding the electrode tab exposed through the welding portion, wherein the mask is configured to pressurize while attached to 70° to 90% a surface area of the current interrupt device.

In the method according to the present invention, an indent portion into which the electrode tab is inserted may be formed around the welding portion, and while the electrode tab is inserted into the indent portion, the first part of the electrode tab may be exposed through the welding portion, and a remainder of the electrode tab may be pressurized in a direction of the current interrupt device by the indent portion of the mask.

That is, according to the method according to the present invention, the electrode tab and the current interrupt device may be pressurized altogether and simultaneously by the pressurizing mask, and particularly, the mask is configured to pressurize while attached to 70% to 90% of the area of the current interrupt device, so the pressure may be dispersed and applied to a major part of the current interrupt device.

Accordingly, partial transformation of the current interrupt device caused by the pressure may be prevented, and the pressure may be uniformly applied to the entire top cap assembly.

Further, the mask additionally pressurizes the current interrupt device via the electrode tab pressurized by the indent portion, so the entire mask including a welding portion is substantially pressurized and the dispersion of the above-noted pressure is more efficient.

In the present invention, the current interrupt device and the mask may each have an external edge forming a circular shape in a plane view, the mask may pressurize the current interrupt device at a position where a center of the current interrupt device and a center of the mask are aligned with each other, and the welding portion may be offset from the center of the mask.

Therefore, when any kind of virtual axis passing through the current interrupt device and the center of the pressurizing mask is set as reference in a plane view, the pressures formed on the respective divided portions may be substantially the same and may be substantially uniformly dispersed in the directions going toward the external circumference from the center. Hence, according to the method according to the present invention, an asymmetric transformation of the top cap assembly caused by applying an asymmetric pressure, and a mismatching or separation of parts of the top cap assembly, may be solved.

In another way, according to the present invention, the welding may be laser welding.

Advantageous Effects

As described above, regarding the pressurizing mask according to the present invention, the indent portion into which the electrode tab may be inserted is formed, and when a pressure is applied, a pressure may be directly applied to the electrode tab, and the pressure may be directly applied to the portion except the indent portion while it is closely attached to the current interrupt device.

Regarding the method according to the present invention, the electrode tab and the current interrupt device may be pressurized together and simultaneously by the pressurizing mask, and particularly, the mask is configured to pressurize while the same is closely attached to 70% to 90% of the area of the current interrupt device, so the pressure may be dispersed and applied to most of the current interrupt device.

Further, when any kind of virtual axis passing through the current interrupt device and the center of the pressurizing mask is set as a reference in a plane view, the pressures generated by the respective divided portions may be formed to be substantially the same, the pressures may be substantially uniformly dispersed in all directions going to the external circumference from the center, and hence, according to the method according to the present invention, an asymmetric transformation of the top cap assembly caused by applying an asymmetric pressure, and a mismatching or separation of parts of the top cap assembly, may be solved.

MODE FOR INVENTION

Exemplary embodiments of the present invention will be described in detail with reference to the accompanying drawings. In describing the present invention, a description of known functions or configurations will be omitted so as to make the subject matter of the present invention more clear.

To clearly describe the present invention, portions which do not relate to the description are omitted, and like reference numerals designate like elements throughout the specification. The size and thickness of each component shown in the drawings are arbitrarily shown for better understanding and ease of description, but the present invention is not limited thereto.

Figure 3:
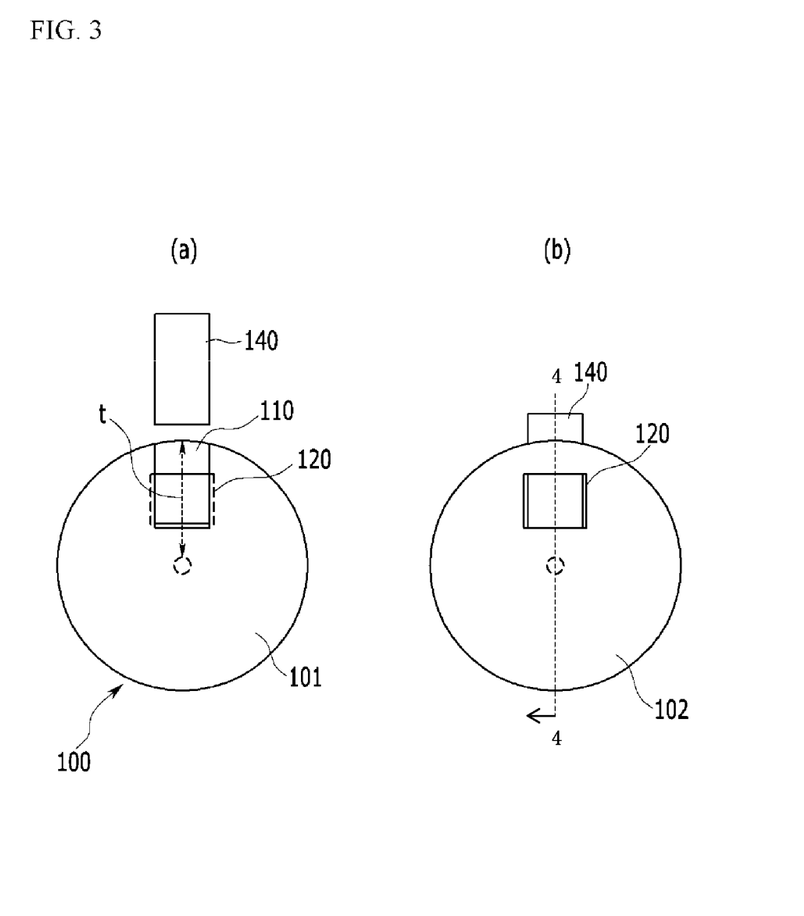
FIG. 3 shows schematic views (a, b) of respective sides of a pressurizing mask according to an exemplary embodiment of the present invention.
Figure 4:
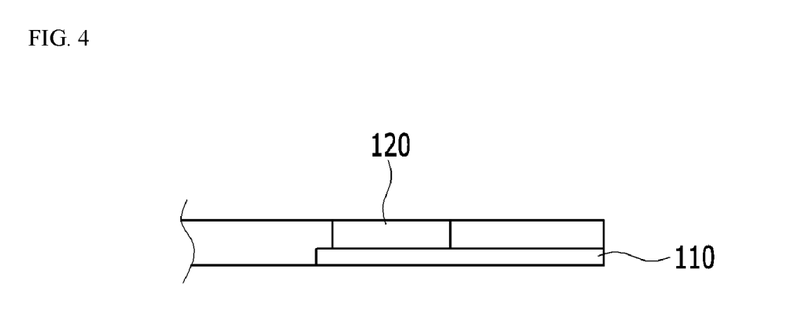
FIG. 4 shows a vertical cross-sectional view of a pressurizing mask with respect to a vertical line 4-4 of FIG. 3.

FIG. 3 shows schematic views (a, b) of respective sides of a pressurizing mask according to an exemplary embodiment of the present invention, and FIG. 4 shows a vertical cross-sectional view of a pressurizing mask with respect to a vertical line A-A'.

Referring to FIG. 3 and FIG. 4, the pressurizing mask 100 includes an external circumference forming a circle in a plane view.

Regarding the pressurizing mask 100, a welding portion 120 for exposing an electrode tab 140 is also formed at a position biased with respect to the center (c).

Here, the biased position signifies a middle portion of a radius (t) forming a space between the center (c) and the external circumference, and the welding portion 120 is perforated at a position where a mass center on a plane corresponds to the middle portion.

Regarding the pressurizing mask 100, in addition, an indent portion 110 into which the electrode tab 140 is inserted is formed on a peripheral portion of the welding portion 120.

The indent portion 110 may be formed in a first side 101 to traverse the welding portion 120 from the external circumference, and the electrode tab 140 may be exposed to the outside through the welding portion 120 on a second side 102 that is an opposite side of the first side 101.

Therefore, regarding the pressurizing mask 100, while the electrode tab 140 is mounted in the indent portion 110, the first side 101 may contact a current interrupt device (310 of FIG. 6) of a top cap assembly (300 of FIG. 6), and when a pressure is applied in the direction of the first side 101 from the second side 102, the current interrupt device (310 of FIG. 6) and the electrode tab 140 may be pressurized together to support the welding between the current interrupt device (310 of FIG. 6) and the electrode tab 140.

Further, the electrode tab 140 is exposed to the outside through the welding portion 120, and laser welding may be performed through the surface of the exposed electrode tab 140.

The above-described pressurizing mask 100 includes the indent portion 110 into which the electrode tab 140 may be inserted, so it has a structural merit that, when a pressure is applied, the pressure may be directly applied to the electrode tab 140, and the pressure may be directly applied to the portion except the indent portion 110 while closely attached to the current interrupt device 310.

Figure 5:
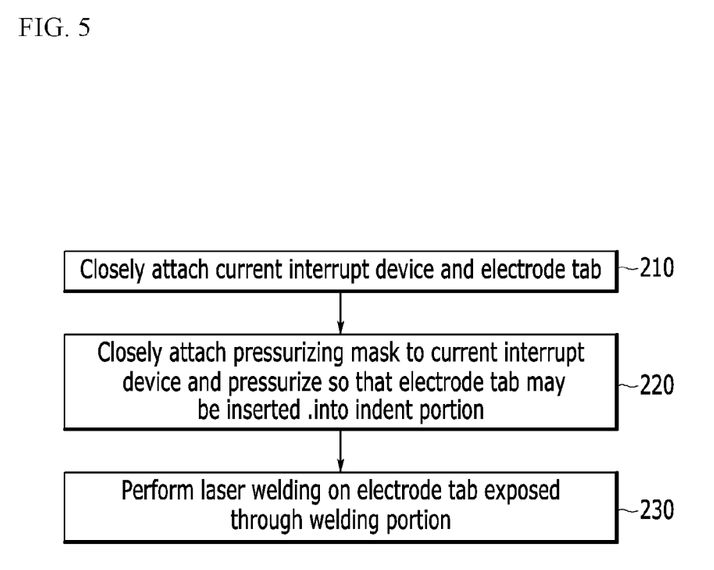
FIG. 5 shows a flowchart of a method according to an exemplary embodiment of the present invention.
Figure 6:
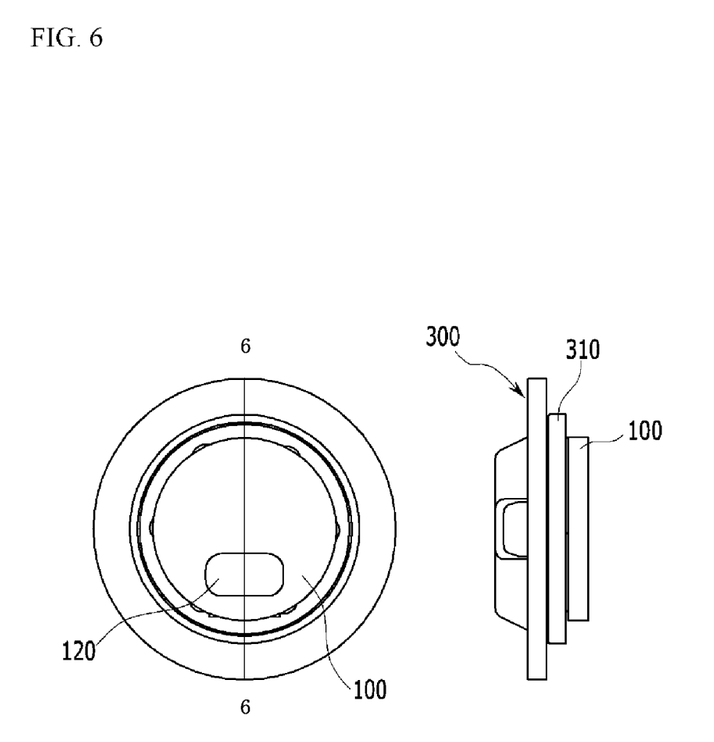
FIG. 6 shows a schematic view of formation of combining a top cap assembly and an electrode tab by using a mask according to an exemplary embodiment of the present invention.

FIG. 5 shows a flowchart of a method according to an exemplary embodiment of the present invention, and FIG. 6 shows a schematic view of a form for pressurizing a current interrupt device 310 of a top cap assembly 300 and an electrode tab 140 by using a pressurizing mask 100 according to an exemplary embodiment of the present invention.

To help understand the invention, a configuration of the pressurizing mask 100 described with reference to FIG. 3 and FIG. 4 will be described in combination with a description to be provided hereinafter.

Referring to FIG. 3 to FIG. 6, the electrode tab 140 is closely attached to the current interrupt device 310 of the top cap assembly 300 in step 210. After this, in step 220, the pressurizing mask 100 is closely attached to the current interrupt device 310 at a position where a center (not shown) of the current interrupt device 310 corresponds to a center (c) of the pressurizing mask 100, and in this instance, the electrode tab 140 is inserted into an indent portion 110 formed in one side of the pressurizing mask 100.

In the present step, while the electrode tab 140 is completely inserted into the indent portion 110, the current interrupt device 310 is pressurized with the pressurizing mask 100, and in next step 230, laser welding is performed on the electrode tab 140 exposed through the welding portion 120 of the pressurizing mask 100.

As shown in FIG. 6, the mask 100 has an area of substantially 80% of the area of the current interrupt device 310 and is closely attached to the current interrupt device 310 one-on-one, so most of the current interrupt device 310 may be pressurized, and the corresponding pressure may be dispersed to the current interrupt device 310.

Further, the current interrupt device 310 and the mask 100 have external circumferences forming to be circular in a plane view, so according to the present invention in which the mask 100 pressurizes the current interrupt device 310 at the position where the centers of the current interrupt device 310 and the mask 100 correspond to each other, when any kind of a virtual axis passing through the center (c) of the current interrupt device 310 and the pressurizing mask 100, for example, line 4-4 of FIG. 3 or line 6-6 of FIG. 6 is set to be a reference, the pressures formed on the respective divided portions are substantially the same, and the pressure may be substantially uniformly dispersed in all directions going toward the external circumference from the center (c).

Hence, according to the method according to the present invention, an asymmetric transformation of the top cap assembly 300 caused by applying an asymmetric pressure, and a mismatching or separation of parts of the top cap assembly 300 may be solved.

Specific exemplary embodiments of the present invention have been described and illustrated above, but the present invention is not limited to the above-mentioned exemplary embodiments. Therefore, the present invention can be variously changed and modified from the description by a person skilled in the art to which the present invention pertains without departing from the idea and scope of the present invention. Therefore, modified examples or changed examples are not to be individually construed from the technical spirit or aspect of the present invention, and therefore, the modified exemplary embodiments are to be construed to be included in the claims of the present invention.

The invention claimed is:

1. A pressurizing mask for supporting a combination of a top cap assembly and an electrode assembly, comprising:
    a body having a first surface, a second surface opposite the first surface and an external edge extending between the first surface and second surface and forming a circle on a plane view,
    wherein a welding portion for exposing an electrode tab is formed spaced from a center of the body, and
    wherein an indent portion into which the electrode tab is inserted is formed in a peripheral portion of the welding portion.

2. The pressurizing mask of claim 1, wherein a depth of the indent portion is 99% to 101% of a thickness of the electrode tab, and
    wherein a width of the indent portion is 99% to 101% of a width of the electrode tab.

3. The pressurizing mask of claim 1, wherein the indent portion is formed on a first side of the body to traverse the welding portion from the external edge, and
    wherein the electrode tab is exposed to an outside through the welding portion on a second side of the body that is an opposite side of the first side of the body.

4. The pressurizing mask of claim 1, wherein the welding portion extends along at least one middle portion of a radius extending between the center of the body and the external edge, and the welding portion is perforated at a position where a mass center of the welding portion on a plane corresponds to the middle portion.

5. The pressurizing mask of claim 1, wherein the welding portion has a form including a circle, an oval, a polygon, or at least one curved line in a plane view.

6. The pressurizing mask of claim 1, wherein the indent portion is a groove formed in the second surface and the welding portion extends from the groove to the first surface.

7. The pressurizing mask of claim 1, wherein the indent portion is a groove formed in the second surface.

8. The pressurizing mask of claim 7, wherein the indent portion extends inward from the external edge.

9. The pressurizing mask of claim 7, wherein the welding portion extends from the groove to the first surface.

10. A pressurizing mask for supporting a combination of a top cap assembly and an electrode assembly, comprising:
    a body having an external edge forming a circle on a plane view,
    wherein a welding portion for exposing an electrode tab is formed spaced from a center of the body,
    wherein an indent portion into which the electrode tab is inserted is formed in a peripheral portion of the welding portion,
    wherein the indent portion is formed on a first side of the body to traverse the welding portion from the external edge,
    wherein the electrode tab is exposed to an outside through the welding portion on a second side of the body that is an opposite side of the first side of the body,
    wherein when the electrode tab is mounted to the indent portion, the first side of the body is configured to contact a current interrupt device of the top cap assembly, and
    wherein when a pressure is applied in a direction of the first side from the second side, the current interrupt device and the electrode tab are configured to be pressurized to support welding between the current interrupt device and the electrode tab.

* * * * *